United States Patent [19]

Kuroda et al.

[11] Patent Number: 5,509,268
[45] Date of Patent: Apr. 23, 1996

[54] COMBUSTION STATE-DETERMINING SYSTEM AND COMBUSTION STATE CONTROL SYSTEM FOR INTERNAL COMBUSTION ENGINES

[75] Inventors: Shigetaka Kuroda; Kazutomo Sawamura; Masayoshi Yamanaka, all of Wako, Japan

[73] Assignee: Honda Giken Kogyo Kabushiki Kaisha, Tokyo, Japan

[21] Appl. No.: 208,686

[22] Filed: Mar. 11, 1994

[30] Foreign Application Priority Data

Mar. 26, 1993 [JP] Japan .................................... 5-092035

[51] Int. Cl.$^6$ ........................................................ F01N 2/28
[52] U.S. Cl. ............................................................ 60/277
[58] Field of Search ........................................ 60/277, 276

[56] References Cited

U.S. PATENT DOCUMENTS 3,965,677  6/1976  Goto ........................................... 60/277
3,983,754  10/1976 Deguchi ..................................... 60/277

FOREIGN PATENT DOCUMENTS 4-81548  3/1992  Japan .

Primary Examiner—Douglas Hart
Attorney, Agent, or Firm—Nikaido, Marmelstein, Murray & Oram

[57] ABSTRACT

A combustion state-determining system for an internal combustion engine has an ECU which determines a misfiring state of the engine, and calculates a misfiring rate of the engine, based on the result of the determination of the misfiring state. A catalyst temperature sensor detects the temperature of a catalytic converter as the exhaust system temperature, and the ECU determines the combustion state of the engine, based on the detected exhaust system temperature and the calculated misfiring rate. A combustion state control system restrains the output from the engine, based on the determination result of the combustion state-determining system.

7 Claims, 12 Drawing Sheets

COMBUSTION STATE-DETERMINING SYSTEM AND COMBUSTION STATE CONTROL SYSTEM FOR INTERNAL COMBUSTION ENGINES

BACKGROUND OF THE INVENTION

1. Field of the Invention

This invention relates to a combustion state-determining system for internal combustion engines, for detecting a misfire occurring therein, to thereby determine a state of combustion thereof, based on the misfiring rate of the engine, and also to a combustion state control system for controlling the combustion state of the engine, based on the determination result of the combustion state-determining system.

2. Prior Art

There are conventionally known various kinds of combustion state-determining systems for internal combustion engines, as proposed, for example, by Japanese Provisional Patent Publication (Kokai) No. 4-81548 by the present assignee, which finally determines that the engine is in a misfiring state when misfires have occurred in the engine at a predetermined rate or more, and then alerts the driver to take an appropriate failsafe action to prevent component parts of the exhaust system, especially a catalytic converter for purifying exhaust gas components, of the engine from being adversely affected by misfires.

In the above proposed conventional system, the predetermined misfiring rate is set based on a result of tests conducted beforehand, to such a value above which degradation in the performance of exhaust system component parts, especially the catalytic converter, is accelerated. Therefore, when the performance of the engine is degraded or the performance of the catalytic converter is deteriorated due to aging, the predetermined misfiring rate becomes unsuitable for determination of a misfiring state. As a result, it can happen that the engine is not determined to be in a misfiring state even when misfires have occurred at a high misfiring rate which causes accelerated deterioration of the catalytic converter.

Further, in the proposed conventional system, it is immediately determined that the engine is in a misfiring state which may accelerate deterioration of the catalytic converter when the misfiring rate of the engine exceeds a predetermined reference value (i.e. predetermined misfiring rate). In actuality, however, the temperature of the catalytic converter elevates to a level which accelerates deterioration of the catalytic converter, only after the lapse of a certain time period from the time the misfiring rate exceeds the predetermined reference value. In other words, the engine is not always in a combustion state which accelerates deterioration of the catalytic converter, even when the misfiring rate exceeds the predetermined reference value.

Furthermore, when the engine is finally determined to be in a misfiring state, a warning is issued to alert the driver to take an appropriate failsafe action, or when the engine is finally determined to be in a misfiring state which accelerates deterioration of the catalytic converter, some control is carried out to restrain deterioration of component parts of the exhaust system. However, the failsafe and control operations are not always perfect to properly restrain deterioration of exhaust system component parts.

SUMMARY OF THE INVENTION

It is a first object of the invention to provide a combustion state-determining system for internal combustion engines, which is capable of properly performing determination of a combustion state (misfiring state) of the engine by taking into consideration deterioration of the performance of a catalytic converter of the engine.

It is a second object of the invention to provide a combustion state control system for internal combustion engines, which is capable of properly restraining deterioration of component parts of the exhaust system when the engine is determined to be in a misfiring state.

To attain the first object, the present invention provides a combustion state-determining system for an internal combustion engine having an exhaust system, and a catalytic converter arranged in the exhaust system, for purifying exhaust gases emitted from the engine, the combustion state-determining system including misfire-determining means for determining a misfiring state of the engine, and misfiring rate-calculating means for calculating a misfiring rate of the engine, based on a determination result of the misfire-determining means.

The combustion state-determining system according to the invention is characterized by comprising:

temperature-detecting means for detecting a temperature of the exhaust system of the engine; and combustion state-determining means for determining a combustion state of the engine, based on the temperature of the exhaust system detected by the temperature-detecting means and the misfiring rate calculated by the misfiring rate-calculating means.

Specifically, for example, when the misfiring rate is below a first predetermined value, the combustion state-determining means determines that the combustion state of the engine is normal if the temperature of the exhaust system is below a predetermined value, and when the misfiring rate exceeds the first predetermined value, the combustion state-determining means determines that the combustion state of the engine is in a first misfiring state which causes an adverse effect on component parts of the exhaust system if the misfiring rate exceeds a second predetermined value which decreases as the temperature of the exhaust system increases, and the combustion state of the engine is in a second misfiring state which causes degradation of exhaust emission characteristics of the engine if the misfiring rate is below the second predetermined value.

Preferably, the combustion state-determining system further includes vehicle speed-detecting means for detecting traveling speed of a vehicle having the engine installed thereon, idling condition-detecting means for detecting an idling condition of the engine, and inhibiting means for inhibiting the determination by the combustion state-determining means when the vehicle is not in a cruising condition wherein the traveling speed of the vehicle is substantially constant and at the same time the engine is not in the idling condition.

To attain the second object, the present invention provides a combustion state control system for an internal combustion engine having an exhaust system, and a catalytic converter arranged in the exhaust system, for purifying exhaust gases emitted from the engine, the combustion state control system including misfire-determining means for determining a misfiring state of the engine, and misfiring rate-calculating means for calculating a misfiring rate of the engine, based on a determination result of the misfire-determining means.

The combustion state control system according to the invention is characterized by comprising:

temperature-detecting means for detecting a temperature of the exhaust system of the engine;

combustion state-determining means for determining a combustion state of the engine, based on the temperature of the exhaust system detected by the temperature-detecting means and the misfiring rate calculated by the misfiring rate-calculating means; and output-restraining means for restraining an output from the engine, depending on a determination result of the combustion state-determining means.

Specifically, for example, when the misfiring rate is below a first predetermined value, the combustion state-determining means determines that the combustion state of the engine is normal if the temperature of the exhaust system is below a predetermined value, and when the misfiring rate exceeds the first predetermined value, the combustion state-determining means determines that the combustion state of the engine is in a first misfiring state which causes an adverse effect on component parts of the exhaust system if the misfiring rate exceeds a second predetermined value which decreases as the temperature of the exhaust system increases, and the combustion state of the engine is in a second misfiring state which causes degradation of exhaust emission characteristics of the engine if the misfiring rate is below the second predetermined value, the output-restraining means restraining the output from the engine when the combustion state-determining means determines that the combustion state of the engine is in the first misfiring state.

Preferably, the combustion state control system further includes engine rotational speed-detecting means for detecting a rotational speed of the engine, and engine load-detecting means for detecting a load on the engine, and wherein the output-restraining means restrains the output from the engine when at least one of conditions is satisfied that the rotational speed of the engine exceeds a predetermined value and the load on the engine exceeds a predetermined value.

Also preferably, the combustion state control system further includes engine temperature-detecting means for detecting a temperature of the engine, and intake air temperature-detecting means for detecting the temperature of air drawn into the engine, the predetermined value of the rotational speed and the predetermined value of the load on the engine being changed in response to at least one of the detected engine temperature and the detected intake air temperature.

Further preferably, the output-restraining means is disabled when the temperature of the exhaust system is below a second predetermined value.

Still further preferably, the second predetermined value of the temperature of the exhaust system is changed in response to the misfiring rate of the engine.

The above and other objects, features, and advantages of the invention will be more apparent from the following detailed description taken in conjunction with the accompanying drawings.

BRIEF DESCRIPTION OF THE DRAWINGS

FIGS. 2(a), 2(b) and 2(c) are flowcharts showing programs (main routines) for determining a state of combustion of the engine, in which:

FIG. 2(a) shows a CRK processing which is executed in synchronism with generation of a crank angle (CRK) signal;

FIG. 2(b) shows a TDC processing which is executed in synchronism with generation of a top dead center (TDC) signal; and FIG. 2(c) shows a #3STG processing which is executed with the same repetition period as that of the TDC processing;

DETAILED DESCRIPTION

The invention will now be described in detail with reference to the drawings showing an embodiment thereof.

Figure 1:
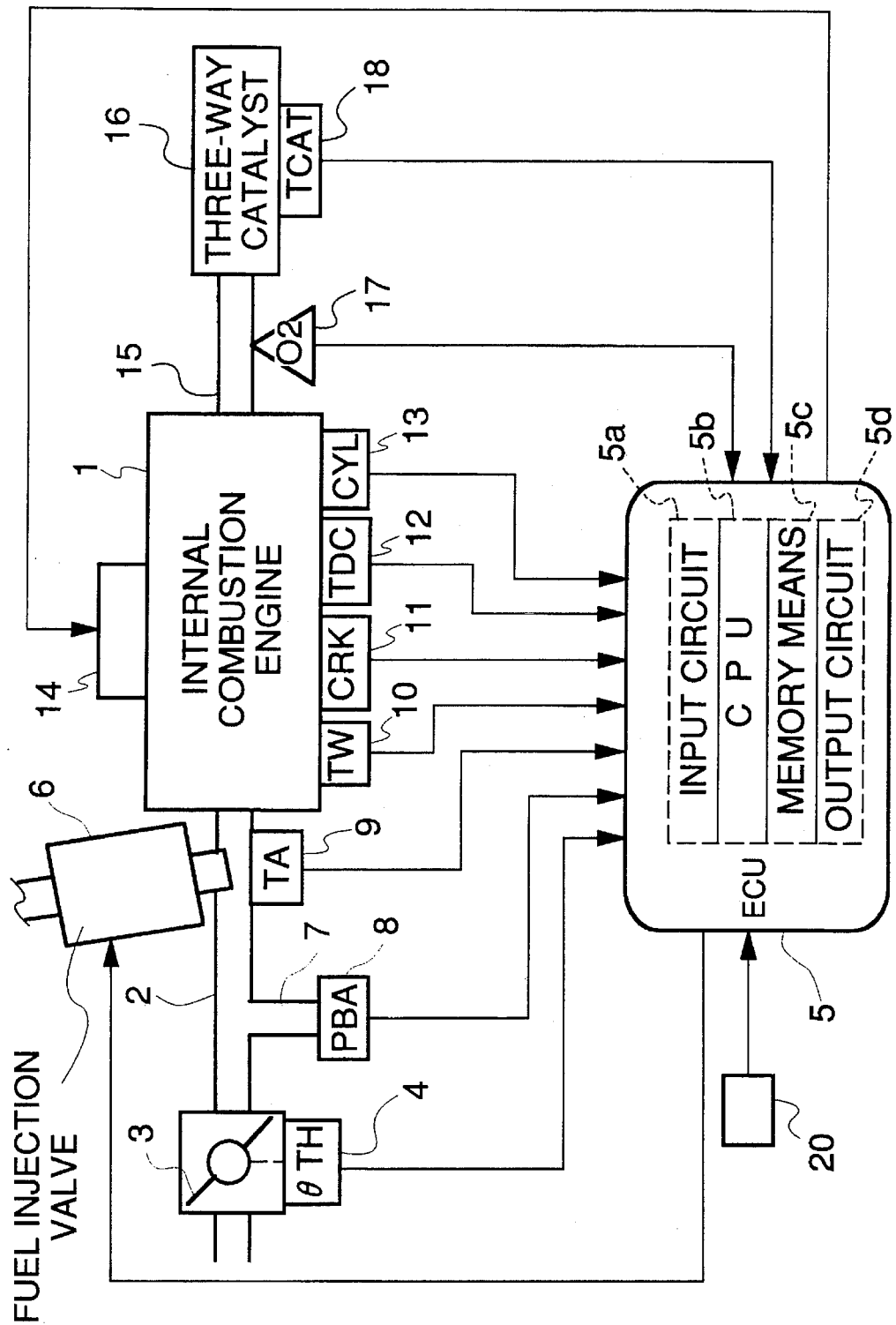
FIG. 1 is a block diagram showing the whole arrangement of an internal combustion engine and control systems therefor, according to an embodiment of the invention.

Referring first to FIG. 1, there is shown the whole arrangement of an internal combustion engine and a combustion state-determining system therefor, according to an embodiment of the invention. In an intake pipe 2 of the engine 1, there is arranged a throttle valve 3, to which is connected a throttle valve opening ($\theta TH$) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulses") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees in the case where the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 14, which is electrically connected to the ECU 5.

A three-way catalyst (catalytic converter) 16 is arranged in an exhaust pipe 15 of the engine 1 for purifying components of HC, CO, NOx, and the like present in the exhaust gases. Arranged in the exhaust pipe 15 at a location upstream of the three-way catalyst 16 is an oxygen concentration sensor 17 for detecting the concentration of oxygen present in the exhaust gases, and supplying a signal indicative of the sensed oxygen concentration to the ECU 5. Further, a catalyst temperature sensor 18 is mounted on the three-way catalyst 6 for detecting the temperature TCAT of the catalyst, and supplying a signal indicative of the sensed catalyst temperature to the ECU 5.

Further connected to the ECU 5 are various sensors 20, such as an atmospheric pressure sensor for detecting atmospheric pressure, and a vehicle speed sensor for detecting the traveling speed of an automotive vehicle on which the engine is installed, and signals indicative of the sensed values are supplied to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the above-mentioned various engine parameter signals from the various sensors to determine operating conditions in which the engine 1 is operating, calculates, based upon the determined engine operating conditions, a fuel injection period for each of the fuel injection valves 6 in synchronism with generation of TDC signal pulses, and supplies, via the output circuit 5d, signals for driving the fuel injection valves 6 and the spark plugs 14.

Figure 2A:
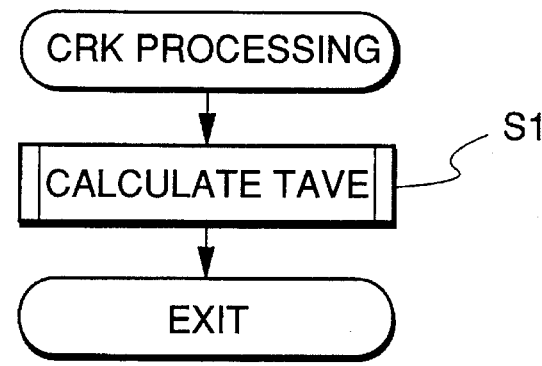
Figure 2B:
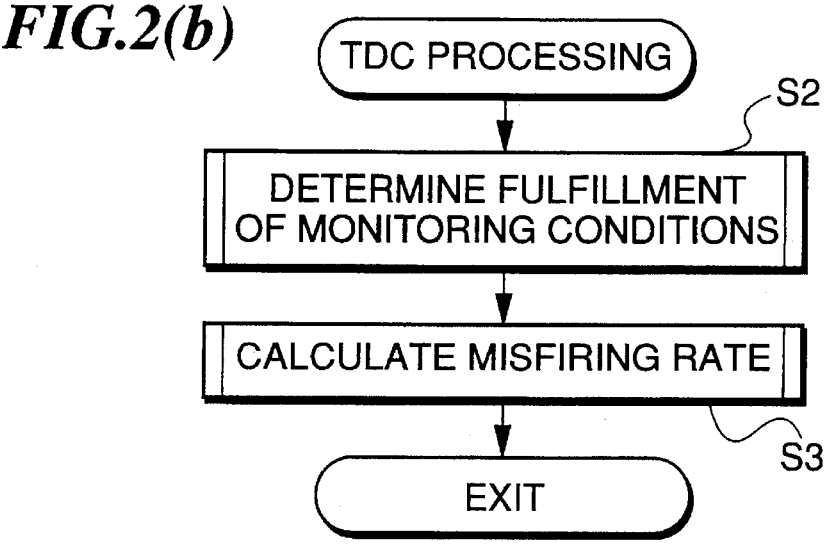
Figure 2C:
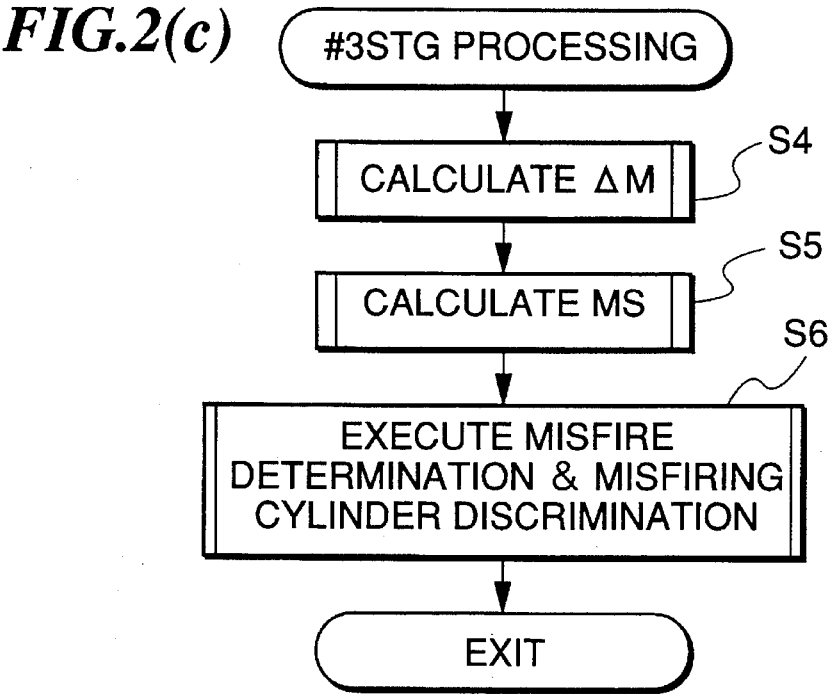

FIGS. 2(a), 2(b) and 2(c) show main routines for determining a combustion state of the engine 1, which are executed by the CPU 5b.

FIG. 2(a) shows a CRK processing carried out in synchronism with generation of CRK signal pulses. At a step S1 of the program, an average value TAVE (hereinafter referred to as "the first average value") of time intervals of occurrence of CRK signal pulses is calculated. The time intervals are proportional to the reciprocal of the engine rotational speed.

FIG. 2(b) shows a TDC processing carried out in synchronism with generation of TDC signal pulses. At a step S2, it is determined whether or not monitoring conditions for permitting determination of a misfiring state are satisfied, i.e. whether or not the misfire determination can be carried out, and then a misfiring rate is calculated at a step S3, based on the number of times of misfire occurrence determined by a #3STG processing in FIG. 2(c), described hereinafter.

The monitoring conditions are satisfied, for example, when the engine is in a steady operating condition, and at the same time the engine coolant temperature TW, the intake air temperature TA, the engine rotational speed NE, etc. are all within respective predetermined ranges.

Figure 4:
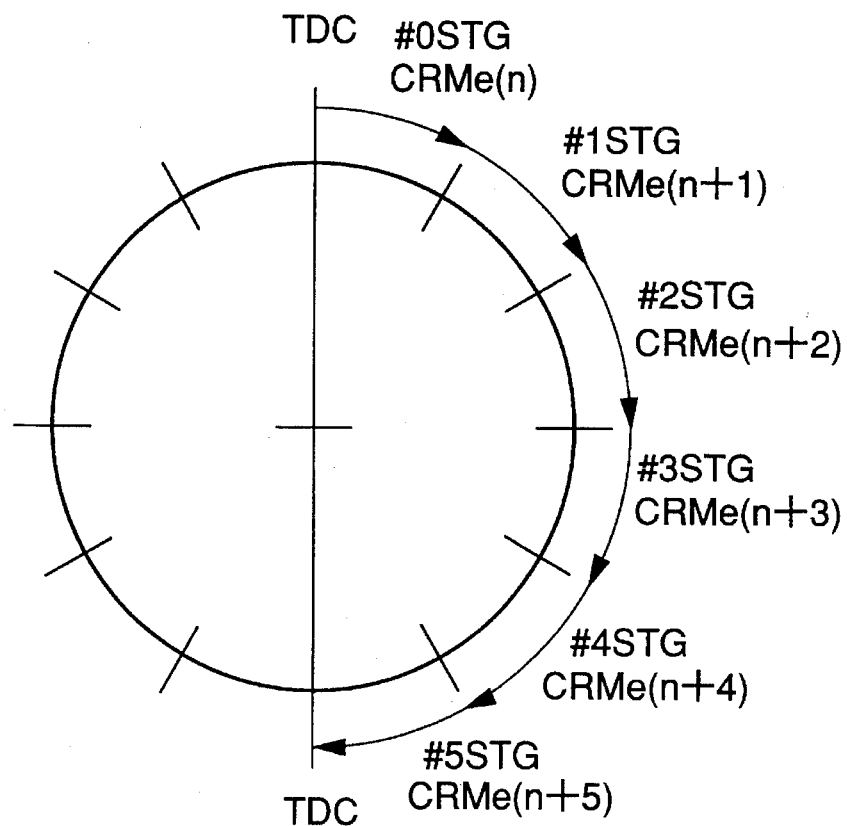
FIG. 4 is a diagram showing the relationship between measurement of a parameter CRMe representative of the engine rotational speed and the rotational angle of a crankshaft.

FIG. 2(c) shows a #3STG processing which is executed with the same repetition period as the TDC processing at a #3 stage #3STG (see FIG. 4). At a step S4, a rate of variation ΔM in an average value M (hereinafter referred to as "the second average value") of the first average value TAVE calculated in the CRK processing is calculated, and then at a step S5 a cumulative value MS of values of the difference between the rate of variation ΔM and an average value thereof is calculated, followed by determining at a step S6 whether or not a misfire has occurred in the engine 1 and discriminating which cylinder has misfired, based on the calculative value MS.

Figure 3:
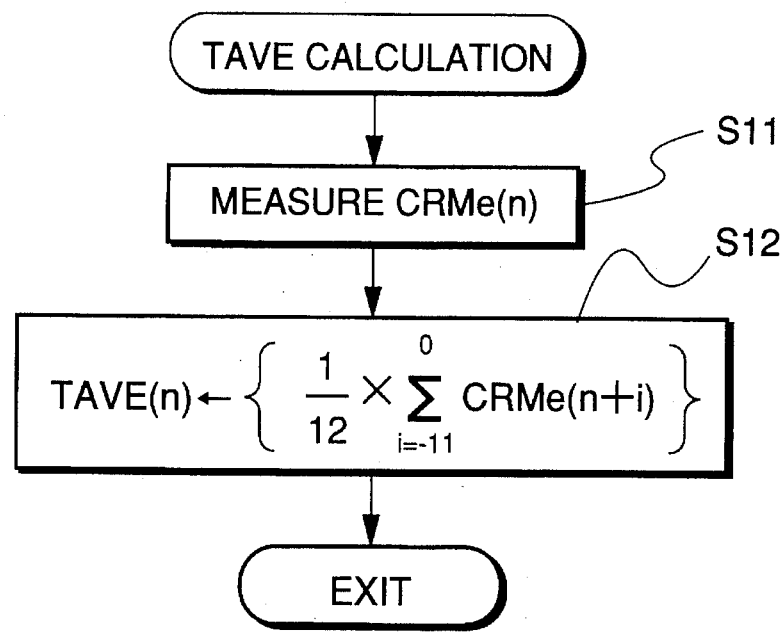
FIG. 3 is a flowchart showing a subroutine for calculating an average value TAVE at a step of the FIG. 2(a) program.

FIG. 3 shows a subroutine for calculating the first average value TAVE at the step S1 of the FIG. 2(a) program. At a step S11, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 4.

A time period over which the crankshaft rotates through 180 degrees is divided every 30 degrees, and the divided time periods are designated as #0STG to #5STG (#0 stage to #5 stage), respectively.

At a step S12, a first average value TAVE(n) is calculated, which is an average value of 12 CRMe values from a value CRMe(n−11) measured eleven loops before the present loop to a value CRMe (n) in the present loop, by the use of the following equation (1):

$$TAVE(n) = 1/12 \times \sum_{i=-11}^{0} CRMe(n+i) \tag{1}$$

In the present embodiment, since CRK signal pulses are each generated whenever the crankshaft rotates through 30 degrees, the first average value TAVE(n) is an average value obtained over one rotation of the crankshaft. The first average value TAVE(n) obtained by such averaging every period of one rotation of the crankshaft is free of the influence of primary vibration components in engine rotation over a period of one rotation of the crankshaft, i.e. noise components due to dimensional errors (such as manufacturing tolerances and mounting tolerances) of a pulse or a pickup forming the crank angle sensor 11.

The engine rotational speed NE is also calculated based on the TAVE(n) value.

Figure 5:
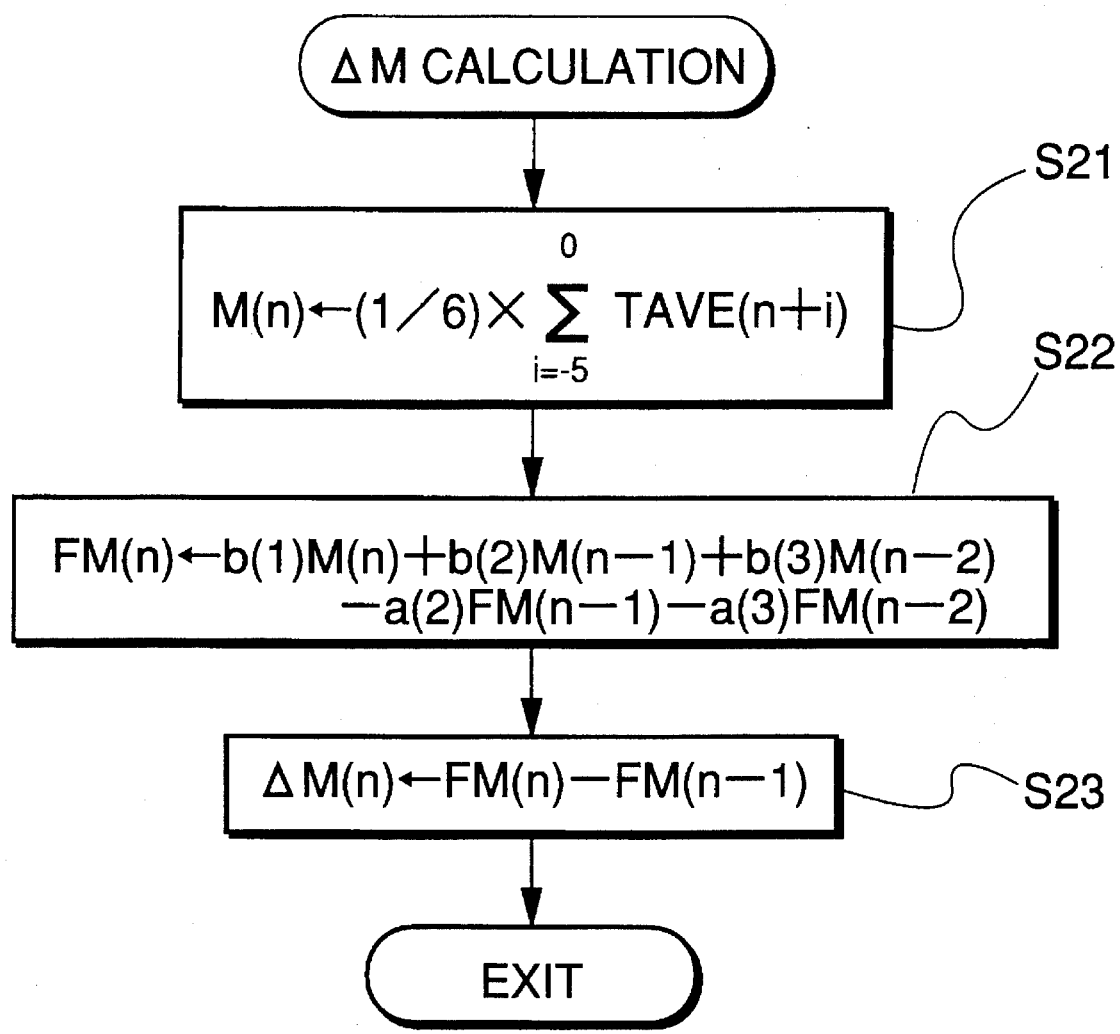
FIG. 5 is a flowchart showing a subroutine for calculating a parameter $\Delta M$ representative of a rate of variation in the engine rotational speed, which is executed at a step of the FIG. 2(c) program.

FIG. 5 shows a subroutine for calculating the rate of variation $\Delta M$, which is executed at the step S4 of the FIG. 2(c) program.

At a step S21, a second average value M(n) is calculated by averaging six TAVE values from a value TAVE(n−5) obtained five loops before to a value TAVE(n) in the present loop, by the use of the following equation (2):

$$M(n) = 1/6 \times \sum_{i=-5}^{0} TAVE(n+i) \tag{2}$$

In the present embodiment, the engine 1 is a 4-cylinder/4-cycle engine, wherein spark ignition is carried out at any one of the cylinders (#1 cylinder to #4 cylinder) whenever the crankshaft rotates through 180 degrees. Therefore, the second average value M(n) is an average value obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, the second average value M(n) thus calculated is subjected to high-pass filtering by the use of the following equation (3), to obtain a high-pass filtered second average value FM(n):

$$FM(n)=b(1)\times M(n)+b(2)\times M(n-1)+b(3)\times M(n-2)-a(2)FM(n-1)-a(3)FM(n-2) \tag{3}$$

where b(1) to b(3), a(2), and a(3) represent filter transmission coefficients, which assume, for example, 0.2096, −0.4192, 0.2096, 0.3557, and 0.1940, respectively. When n in the equation (3) assumes 0 or 1, FM(0) and FM(1) are set to zero, and therefore, the equation (3) is effectively applied when n assumes a value of 2 or more.

The high-pass filtered second average value FM(n) obtained as above is free of frequency components lower than about 10 Hz contained in the M(n) value, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S23, a rate of variation $\Delta M(n)$ in the high-pass filtered second average value FM(n) is calculated by the use of the following equation (4):

$$\Delta M(n)=FM(n)-FM(n-1) \tag{4}$$

The high-pass filtered second average value FM(n) is inverted in sign from that of the M(n) value. Therefore, when a misfire has occurred in the engine 1, the M(n) value is increased, which in turn causes an increase in the FM(n) value in the negative direction and accordingly an increase in the $\Delta M(n)$ value in the negative direction. An increase in the $\Delta M(n)$ value in the negative direction indicates an increase in deceleration of the engine rotational speed.

Figure 6:
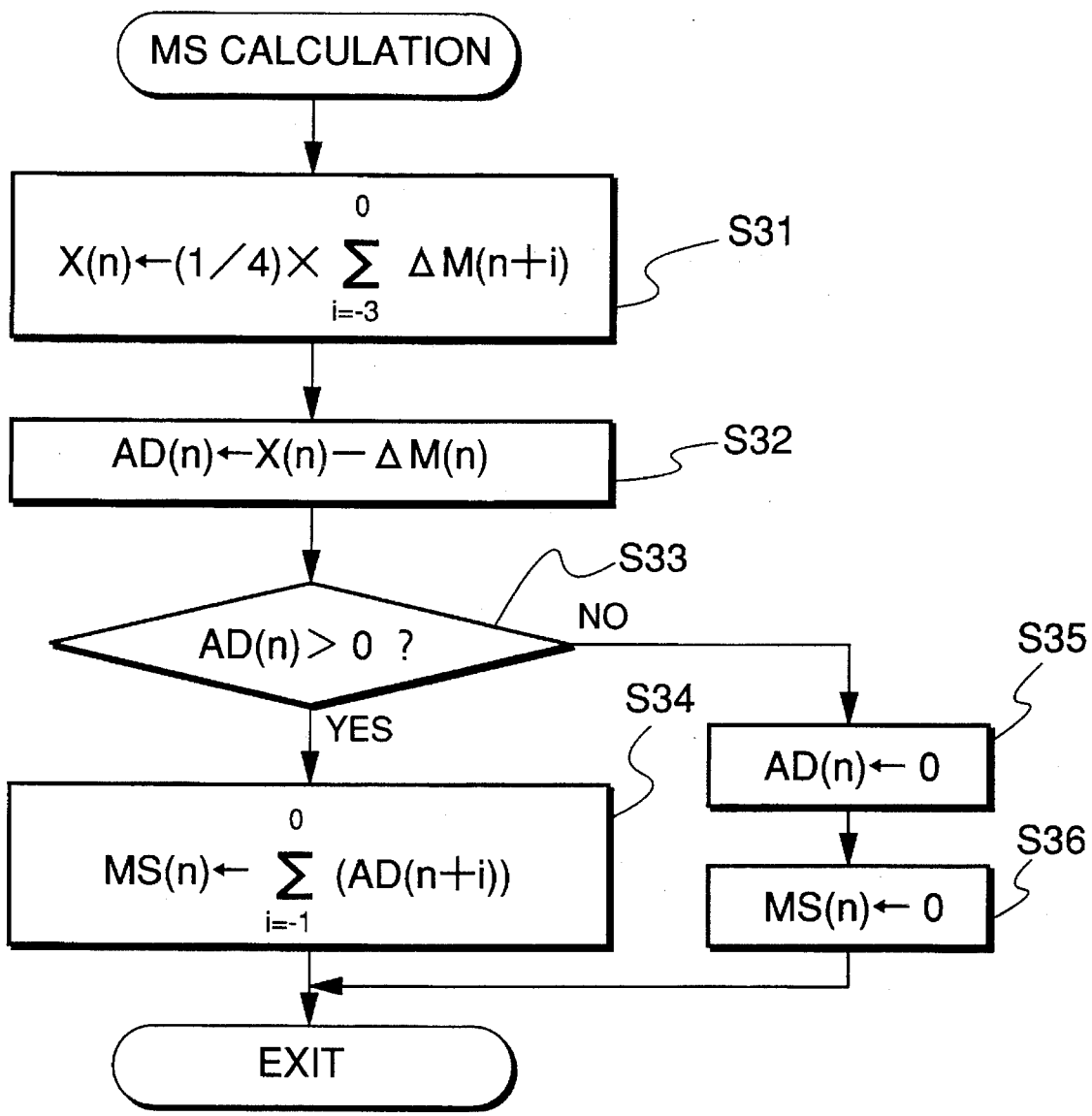
FIG. 6 is a flowchart showing a subroutine for calculating a cumulative value MS of a difference between the parameter $\Delta M$ and an average value thereof, which is executed at a step of the FIG. 2(c) program.

FIG. 6 shows a subroutine for calculating the cumulative value MS at the step S5 in the FIG. 2(c) program.

At a step S31, a variation rate average value X(n) is calculated, which is an average value of four $\Delta M$ values from a value $\Delta M(n-3)$ calculated three loops before the present loop to a value $\Delta M(n)$ in the present loop, by the use of the following equation (5):

$$X(n) = 1/4 \times \sum_{i=-3}^{0} \Delta M(n+i) \tag{5}$$

At the following step S32, a difference AD(n) between the variation rate average value X(n) and the rate of variation $\Delta M(n)$ is calculated by the use of the following equation (6):

$$AD(n)=X(n)-\Delta M(n) \tag{6}$$

Then, it is determined at a step S33 whether or not the difference AD(n) is larger than a value of 0. If AD(n)≦0 stands, the difference AD(n) is set to 0 at a step S35 and a value MS(n) is set to 0 at a step S36. The MS(n) value is a cumulative value of the differences AD(n).

If the answer to the question at the step S33 is affirmative (YES), i.e. if AD(n)>0, the cumulative value MS (n) is calculated by the use of the following equation (7):

$$MS(n) = \sum_{i=-1}^{0} AD(n+i) \tag{7}$$

According to the program of FIG. 6, if the difference AD(n) has a positive value, a value AD(n−1) obtained in the last loop is added to a value AD(n) obtained in the present loop to thereby obtain a cumulative value MS (n) thereof, i.e. the sum of the values AD(n−1) and AD (n), whereas if the difference AD(n) is equal to zero or negative, the value MS(n) is set to 0. Accordingly, only when the difference AD(n) is positive, i.e. only when the variation rate average value X(n) is larger than the rate of variation $\Delta M(n)$, more specifically, only when the rate of variation $\Delta M(n)$ is on the larger deceleration side of the engine rotational speed with respect to the average value X(n), the cumulative value MS(n) is calculated.

By using the thus calculated cumulative value MS(n), misfire determination is carried out as described hereinbelow. As a result, the influence of a variation in the engine rotational speed occurring after the engine rotational speed turns into the increasing direction can be eliminated, and therefore, misfire detection and misfiring cylinder discrimination can be easily and promptly carried out.

In the present embodiment, the time period over which the cumulative value MS(n) is calculated (cumulation period) is set to 360 degrees in terms of crank angle (time period corresponding to generation of two TDC pulses). This is for eliminating the influence of reactive variation in the angular velocity of the crankshaft due to a misfire.

Figure 7:
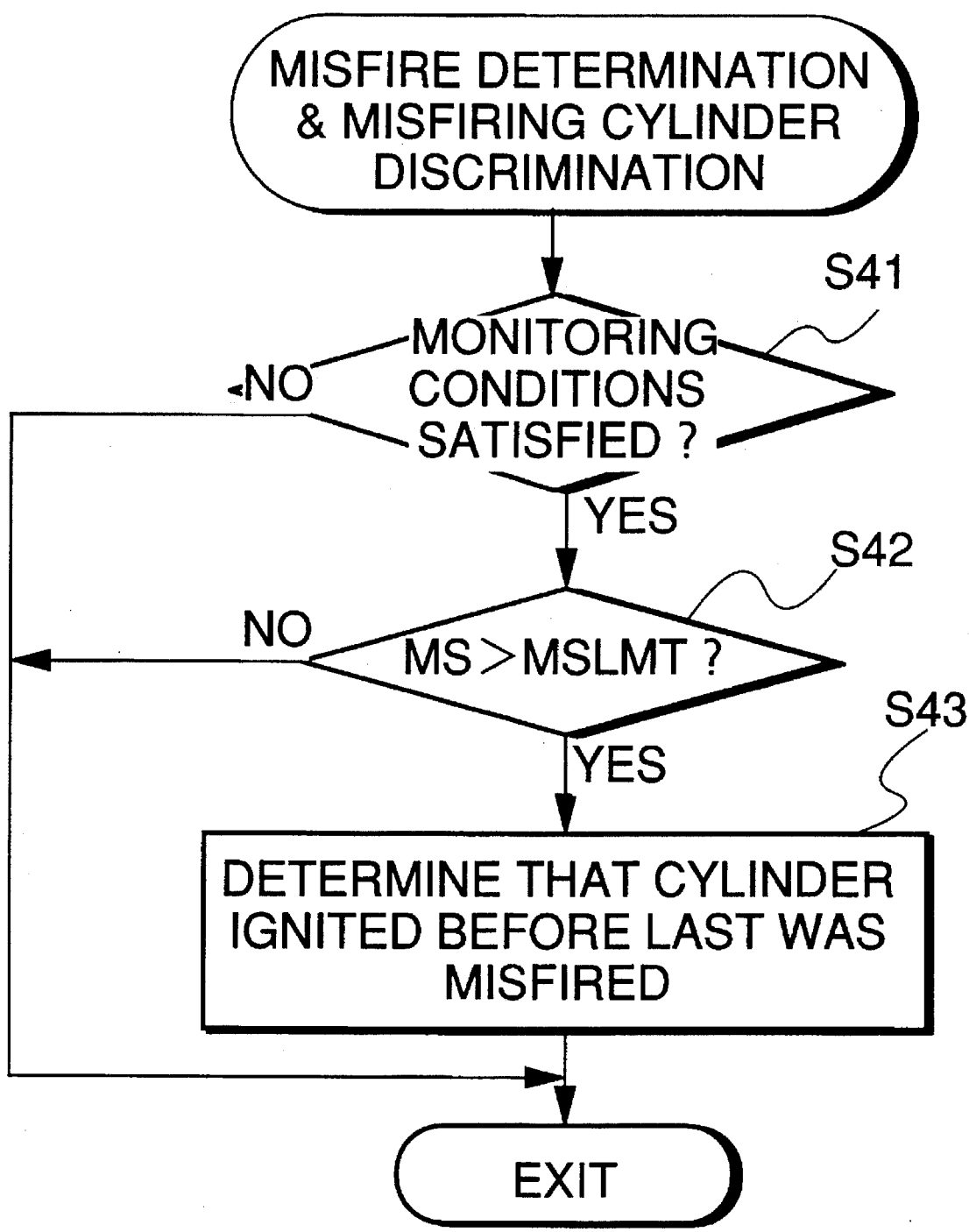
FIG. 7 is a flowchart showing a subroutine for carrying out a misfire determination and a misfiring cylinder discrimination which are executed at a step of the FIG. 2(c) program.

FIG. 7 shows a subroutine for carrying out the misfire determination and the misfiring cylinder discrimination, based on the cumulative value MS calculated as above, which is executed at the step S6 in the FIG. 2(c) program.

At a step S41, it is determined whether or not the aforesaid monitoring conditions are satisfied. If the monitoring conditions are not satisfied, the present program is immediately terminated.

If the monitoring conditions are satisfied, the program proceeds to a step S42, where it is determined whether or not the cumulative value MS is larger than a misfire-determining threshold value MSLMT. The misfire-determining threshold value MSLMT is read out from a map which is set in accordance with the engine rotational speed NE and the engine load (intake absolute pressure PBA). The threshold value MSLMT is set to a smaller value as the engine rotational speed NE increases, and to a larger value as the engine load increases. The above setting contemplates the fact that the combustion period becomes longer as the engine rotational speed decreases, resulting in a larger variation in the engine rotational speed, and the fact that the output torque of the engine becomes larger as the load on the engine increases, resulting in a larger variation in the torque.

If the answer to the question at the step S42 is negative (NO), i.e. if MS≦MSLMT is satisfied, the program is immediately terminated. If the answer to the question of the step S42 is affirmative (YES), i.e. if MS>MSLMT is satisfied, it is determined at a step S43 that a misfire has occurred in a cylinder where spark ignition took place in the loop before the last loop (two TDC signal pulses before the present loop). That is, as described hereinabove, the cumulative value MS is likely to increase as the deceleration of the engine rotational speed increases. Therefore, according to the present embodiment, when the cumulative value MS exceeds the threshold value MSLMT, it is determined that a misfire has occurred.

The reason why it is determined that a misfire has occurred in the cylinder ignited in the loop before the last loop is that the high-pass filtering causes a delay in obtaining the second average value FM(n). The delay may change depending on the type of high-pass filtering (filtering characteristics), and therefore, the misfiring cylinder discrimination should be carried out in a different manner dependent on the type of high-pass filtering (for example, the cylinder that should be determined to have misfired may be a cylinder ignited three TDC signal pulses before the present loop, or the cylinder ignited at the last TDC signal pulse).

Figure 8:
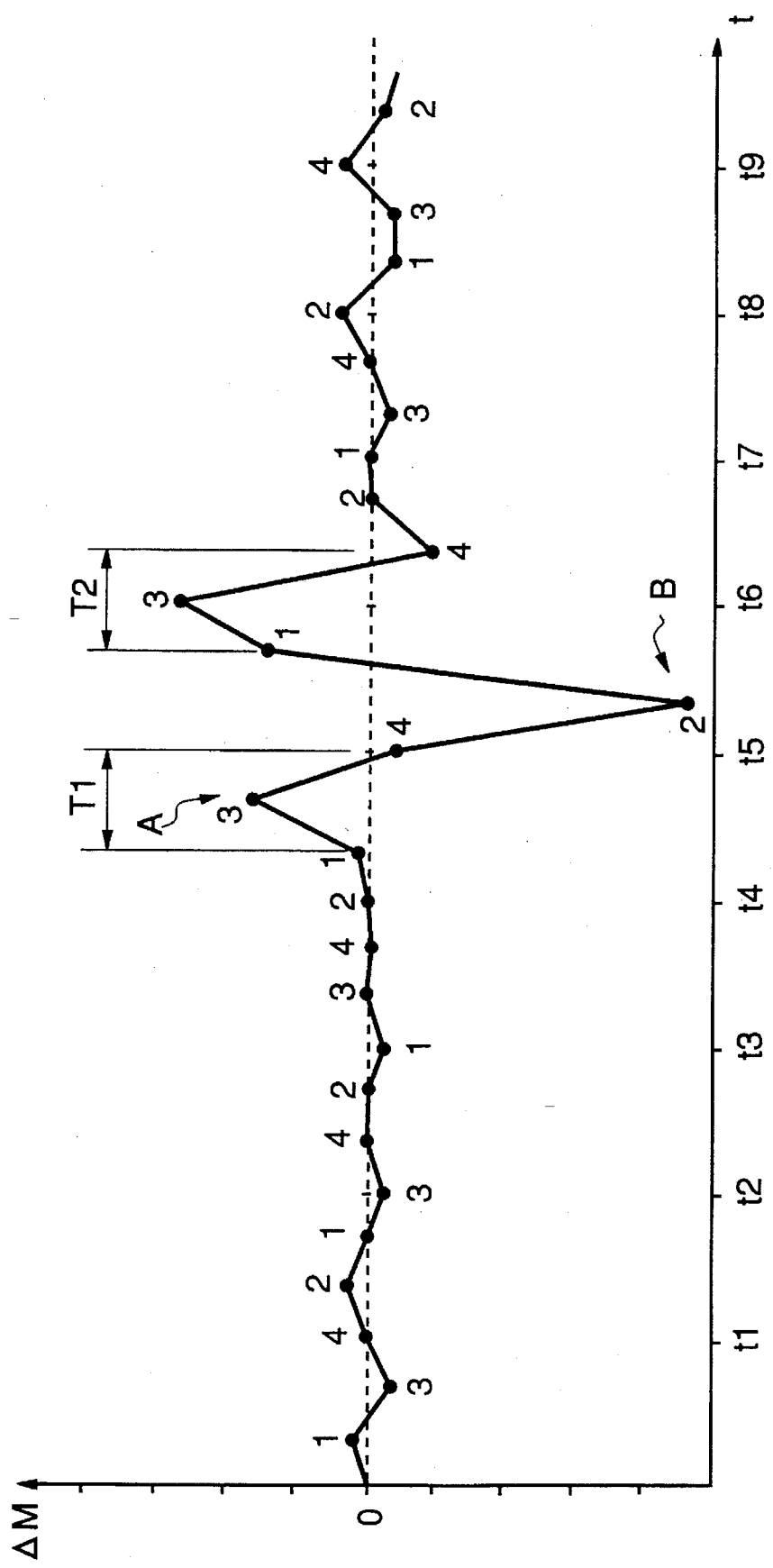
FIG. 8 is a diagram showing a change in the parameter $\Delta M$ in the event of occurrence of a misfire.
Figure 9:
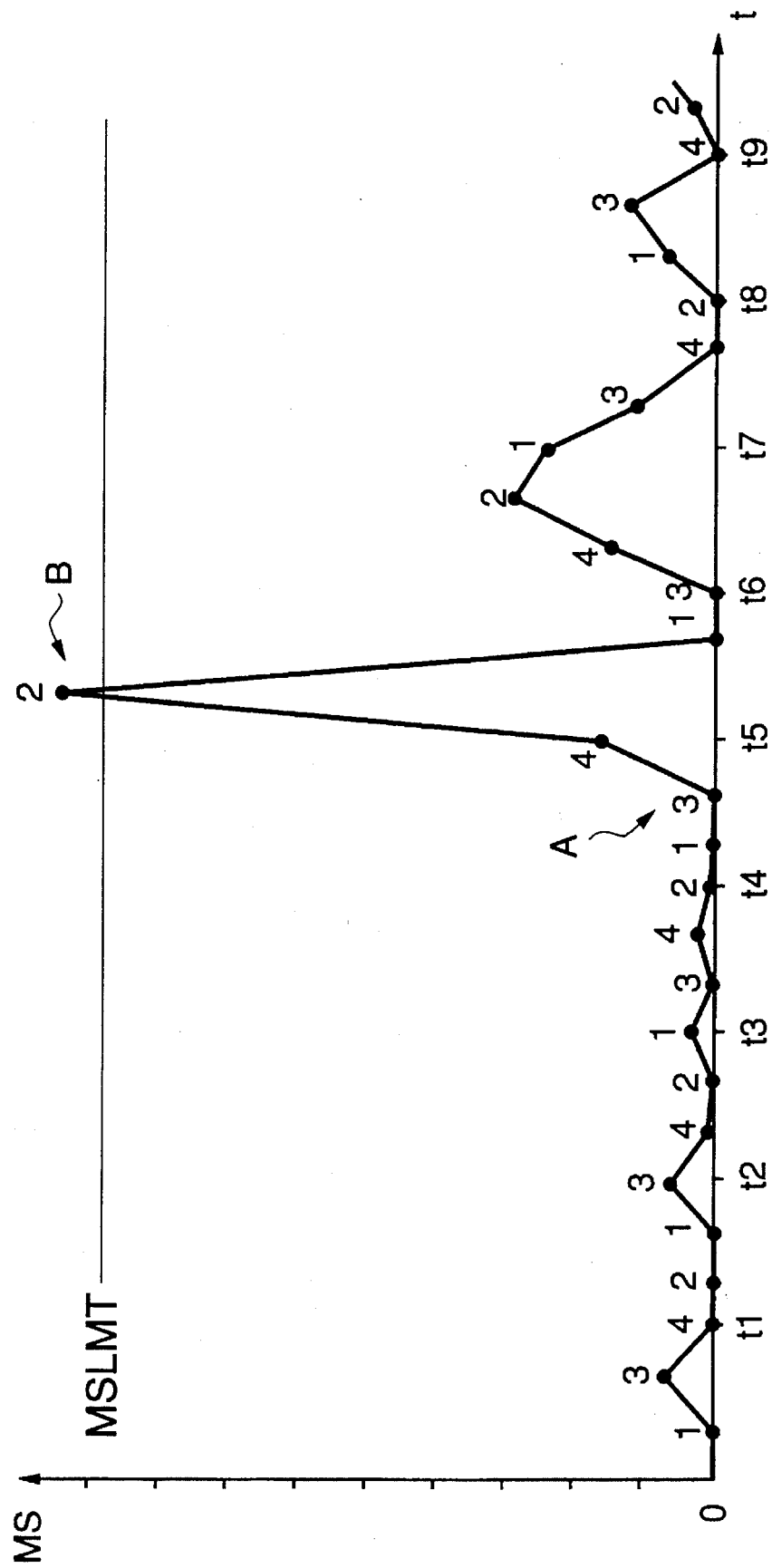
FIG. 9 is a diagram showing a change in the cumulative value MS.

FIG. 8 shows, by way of example, a change in the rate of variation ΔM with the lapse of time in the case where a single misfire has occurred in the #3 cylinder, and FIG. 9 shows a change in the cumulative value MS corresponding to the above change in the rate of variation ΔM with the lapse of time. In these graphs, time points t1 to t9 on the abscissas in the two figures correspond to each other, and numerals in the figures indicate numbers allotted to the cylinders where spark ignition took place.

In the illustrated example, as shown in FIG. 9, the cumulative value MS exceeds the threshold value MSLMT when the #2 cylinder indicated by the arrow B is ignited. Therefore, it is determined that a misfire has occurred in the #3 cylinder indicated by the arrow A (cylinder where spark ignition took place two TDC signal pulses before).

The number of times of misfire occurrence detected by the method as described above is counted by a misfiring rate calculating counter CMF, and a misfiring rate MFR is calculated whenever the crankshaft rotates a predetermined number of times nMF0 (e.g. 1000 rotations), by the use of the following equation (8):

$$MFR = nMF/(nMF0 \times 2) \quad (8)$$

where nMF is a count value of the counter CMF. The nMF0 value is doubled because spark ignition takes place twice over one rotation of the crankshaft of the engine having 4 cylinders.

Figure 10:
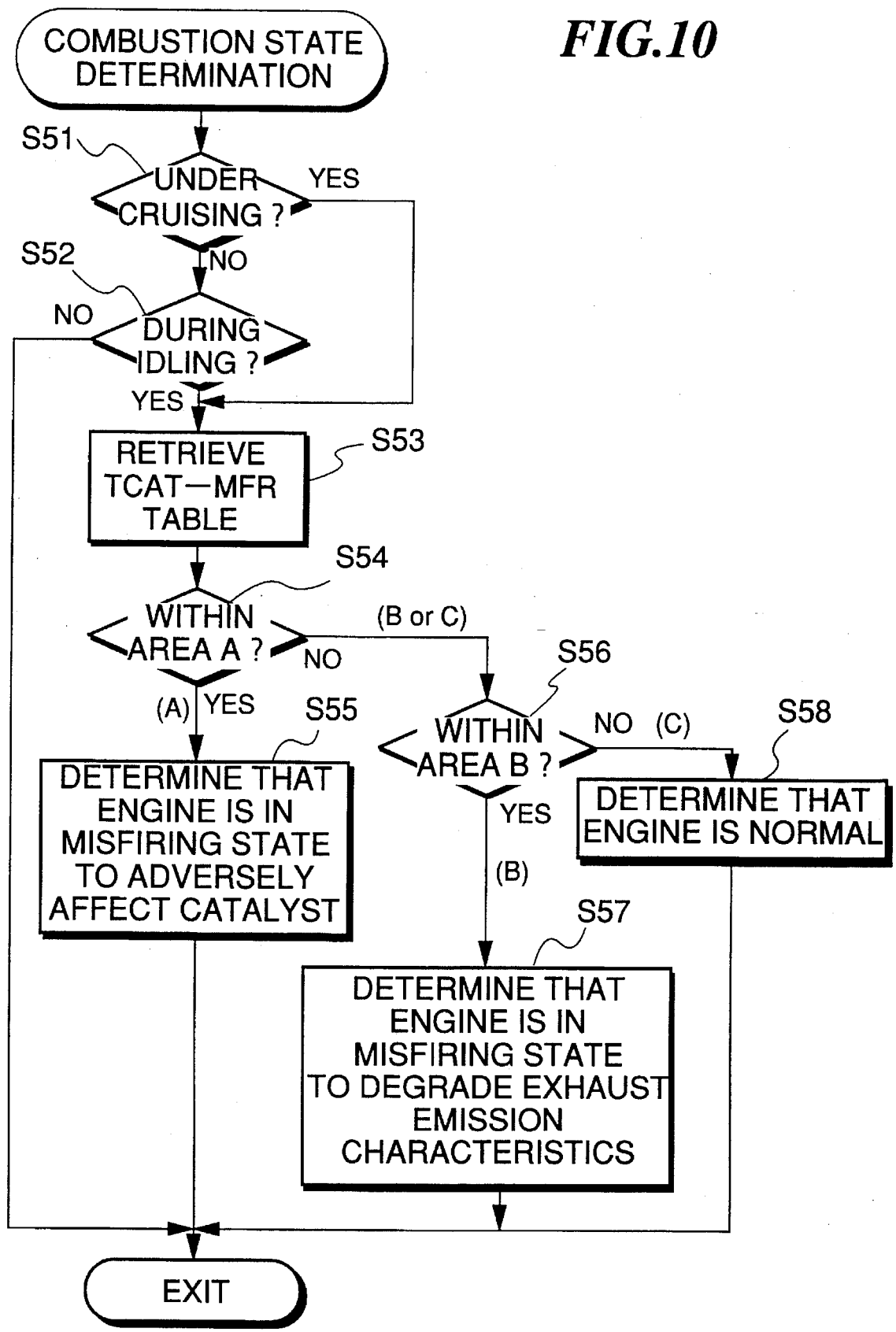
FIG. 10 is a flowchart showing a subroutine for determining a combustion state of the engine, which is executed at a step of a program of FIG. 12.

FIG. 10 shows a subroutine for determining the combustion state of the engine, based on the misfiring rate MFR calculated as above and the catalyst temperature TCAT detected by the catalyst temperature sensor 18.

At a step 51, it is determined whether or not the vehicle is traveling at a constant speed, i.e. in a cruising condition. Then, it is determined at a step S52 whether or not the engine 1 is operating in an idling condition. If the vehicle is not in the cruising condition nor the engine is in the idling condition, the program is immediately terminated.

Figure 11:
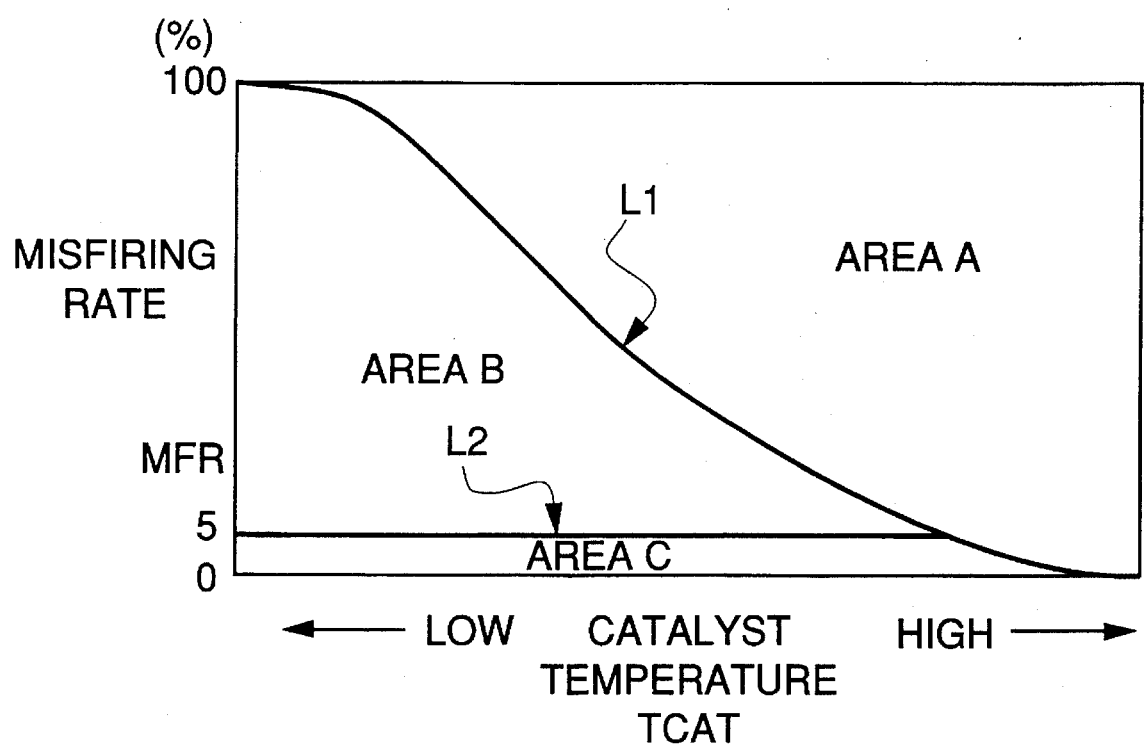
FIG. 11 shows a table for determining the combustion state.

If either the vehicle is in the cruising condition or the engine is in the idling condition, a TCAT-MFR table shown in FIG. 11 is retrieved to determine in which of areas A to C falls the combustion state of the engine, at a step S53. The TCAT-MFR table is set such that the areas A to C are determined in accordance with the catalyst temperature TCAT and the misfiring rate MFR. A borderline (boundary value) L1 between the areas is set such that the MFR value is decreased as the TCAT value increases. A borderline L2 between the areas is set to a value corresponding to a predetermined misfiring rate (5%, according to the present embodiment). The area A is an area where the catalyst temperature TCAT and the misfiring rate MFR are both higher than the borderline L1, the area B an area where TCAT and MFR are both lower than L1 and MFR is higher than L2, and the area C an area where MFR is lower than L2 and TCAT is lower than L1.

At the following steps S54 to S59, the combustion state of the engine is determined based on the determination result at the step S53. That is, it is determined at the step S54 whether or not the combustion state of the engine falls in the area A, and if the answer to the question is affirmative (YES), it is determined at the step S55 that the engine is in a misfiring state which causes an adverse effect on the catalyst. If the answer to the question at the step S54 is negative (NO), it is determined at the step S56 whether or not the combustion state falls in the area B. If the answer to the question is affirmative (YES), it is determined at the step S57 that the engine is in a misfiring state which causes degradation of exhaust emission characteristics. If the answer to the question at the step S56 is negative (NO), it is determined at the step S58 that the combustion state falls in the area C, that is, the combustion state is normal.

As described hereinabove, according to the present embodiment, determination of the combustion state of the engine is carried out based not only on the misfiring rate MFR but also on the catalyst temperature TCAT. As a result, the combustion state of the engine can be properly determined in a manner such that determination of the three-way catalyst 16 is contemplated.

Figure 12:
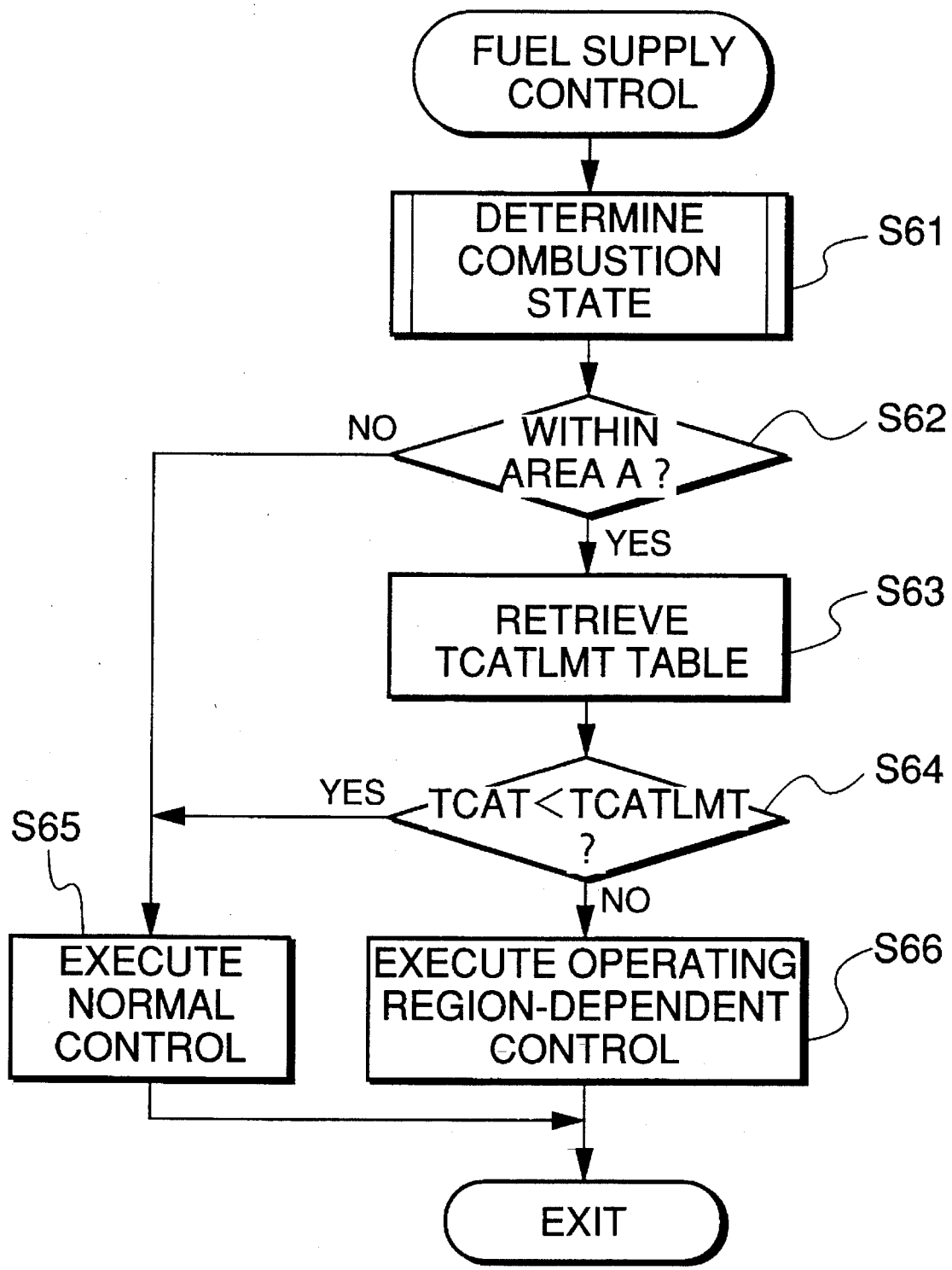
FIG. 12 is a flowchart showing a routine for controlling fuel supply to the engine.

FIG. 12 shows a routine for controlling a fuel amount supplied to the engine, based on the determination result obtained by the FIG. 10 program described above.

At a step S61, determination of the combustion state is executed by the program of FIG. 10. Then, it is determined at a step S62 whether or not the combustion state falls in the area A in FIG. 11. If the answer to the question is negative (NO), the program proceeds to a step S65, where normal fuel supply control is executed.

Figure 13:
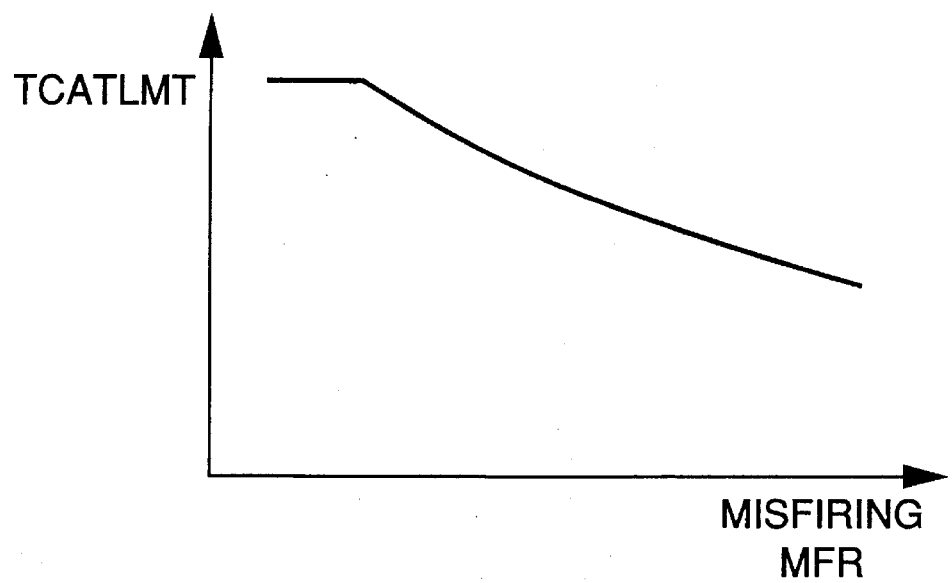
FIG. 13 shows a table for determining a predetermined temperature TCATLMT of a catalytic converter, based on a misfiring rate MFR.

If the combustion state falls in the area A, a TCATLMT table is retrieved to determine a predetermined catalyst temperature TCATLMT in accordance with the misfiring rate MFR at a step S63. The TCATLMT table is set, as shown in FIG. 13, such that the TCATLMT value is decreased as the MFR value increases.

Then, it is determined at a step S64 whether or not the detected catalyst temperature TCAT is lower than the predetermined temperature TCATLMT. If TCAT<TCATLMT is satisfied, the normal fuel supply control is executed at the step S65, whereas if TCAT≦TCATLMT is satisfied, operating region-dependent engine output control is executed at a step S66.

Figure 14:
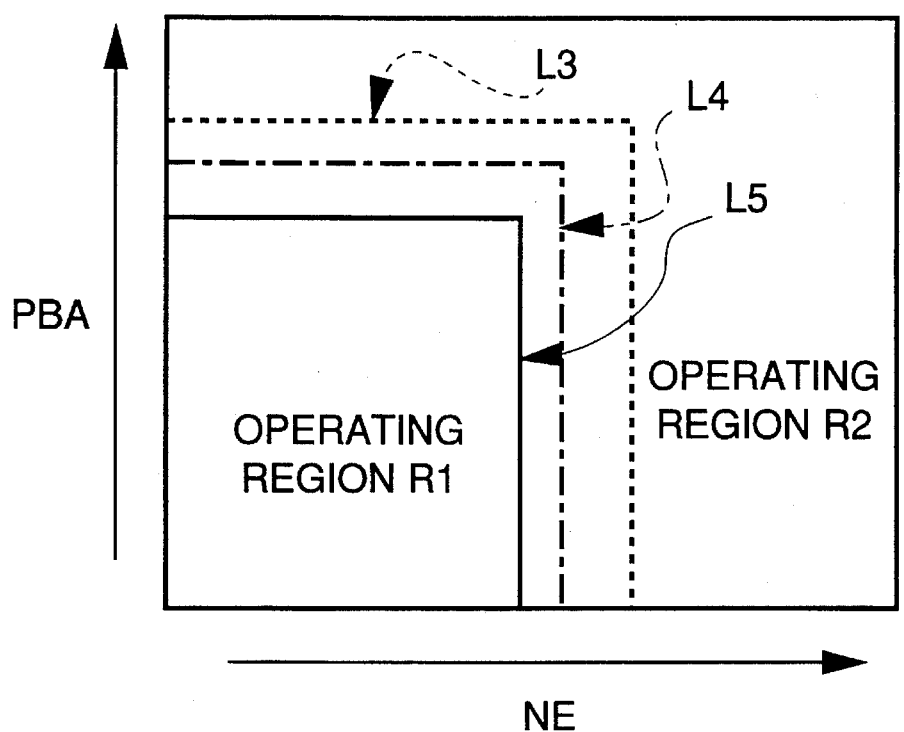
FIG. 14 is a table for selecting engine operating regions in accordance with engine rotational speed NE and intake pipe absolute pressure PBA.

Specifically, the engine output control is carried out as follows: First, operating regions R1 and R2 are selected from a table shown in FIG. 14, in accordance with the engine rotational speed NE and the intake pipe absolute pressure PBA. Then, the normal fuel supply is carried out when the engine operating condition falls in the region R1, whereas fuel supply is interrupted (fuel cut is performed) when the engine operating condition falls in the region R2.

The operating region R2 is a region where the engine rotational speed and/or the engine load is high. The operating regions R1 and R2 are selectively defined by one of three borderlines consisting of a broken line L3, a dot-dash line L4 and a solid line L5, which are selected as follows, based on the intake air temperature TA and the engine coolant temperature TW:

(1) If both TA < TA1 and TW<TW1 are satisfied, the broken line L3 is selected. (2) If either TA1≦TA≦TA2 or TW1≦TW≦TW2 is satisfied, the dot-dash line L4 is selected. (3) If both TA>TA2 and TW>TW are satisfied, the solid line L5 is selected. TA1 and TA2 represent predetermined intake air temperature values set in the relationship of TA1<TA2. TW1 and TW2 represent predetermined engine coolant temperature values set in the relationship of TW1<TW2.

By executing the operating area control as described above, when the combustion state of the engine falls within the area A in FIG. 11, corresponding to a misfiring state which accelerates deterioration of the three-way catalyst A, and at the same time the engine is operating in the high load/high rotational speed area, fuel cut is performed, to thereby restrain deterioration of the three-way catalyst 16 and prevent an adverse effect on peripheral component parts thereof (ascribable to the high temperature of the catalyst). Further, the range of the operating region R2 can be changed in accordance with the intake air temperature TA and the engine coolant temperature TW, to thereby further effectively prevent an adverse effect on component parts of the exhaust system.

In the present embodiment, as mentioned above, the temperature of the three-way catalyst 16 is directly detected. However, alternatively, any other temperature which may represent the temperature of the exhaust system, such as the temperature of exhaust gases and the temperature of the exhaust pipe 15, may be employed to estimate the temperature of the three-way catalyst.

As described in detail above, according to the present embodiment, a misfire in the engine and the temperature of the exhaust system are detected, and the combustion state of the engine is determined based on the detected misfiring rate and exhaust system temperature. Therefore, the combustion state of the engine can be properly determined in a manner such that deterioration of the catalytic converter is contemplated.

Further, the engine output is restrained based on the result of the above determination, and therefore deterioration of the catalytic converter can be properly suppressed, to enable prevention of an adverse effect on the peripheral component parts thereof.

What is claimed is:

1. In a combustion state-determining system for an internal combustion engine having an exhaust system, and a catalytic converter arranged in said exhaust system, for purifying exhaust gases emitted from said engine, said combustion state-determining system including misfire-determining means for determining a misfiring state of said engine, and misfiring rate-calculating means for calculating a misfiring rate of said engine, based on a determination result of said misfire-determining means, the improvement comprising:

temperature-detecting means for detecting a temperature of said exhaust system of said engine; and combustion state-determining means for determining a combustion state of said engine, based on the temperature of said exhaust system detected by said temperature-detecting means and said misfiring rate calculated by said misfiring rate-calculating means, wherein when the misfiring rate is below a first predetermined value, said combustion state-determining means determines that the combustion state of said engine is normal if the temperature of said exhaust system is below a predetermined value, and when the misfiring rate exceeds said first predetermined value, said combustion state-determining means determines that the combustion state of said engine is in a first misfiring state which causes an adverse effect on component parts of said exhaust system if the misfiring rate exceeds a second predetermined value which decreases as the temperature of said exhaust system increases, and the combustion state of said engine is in a second misfiring state which causes degradation of exhaust emission characteristics of said engine if the misfiring rate is below said second predetermined value.

2. A combustion state-determining system as claimed in claim 1, further including vehicle speed-detecting means for detecting-traveling speed of a vehicle having said engine installed thereon, idling condition-detecting means for detecting an idling condition of said engine, and inhibiting means for inhibiting said determination by said combustion state-determining means when said vehicle is not in a cruising condition wherein the traveling speed of said vehicle is substantially constant and at the same time said engine is not in said idling condition.

3. In a combustion state control system for an internal combustion engine having an exhaust system, and a catalytic converter arranged in said exhaust system, for purifying exhaust gases emitted from said engine, said combustion state control system including misfire-determining means for determining a misfiring state of said engine, and misfiring rate-calculating state of said engine, and misfiring rate-calculating means for calculating a misfiring rate of said engine, based on a determination result of said misfire-determining means, the improvement comprising:

temperature-detecting means for detecting a temperature of said exhaust system of said engine;

combustion state-determining means for determining a combustion state of said engine, based on the temperature of said exhaust system detected by said temperature-detecting means and said misfiring rate calculated by said misfiring rate-calculating means; and output-restraining means for restraining an output from said engine, depending on a determination result of said combustion state-determining means, wherein when the misfiring rate is below a first predetermined value, said combustion state-determining means determines that the combustion state of said engine is normal if the temperature of said exhaust system is below a predetermined value, and when the misfiring rate exceeds said first predetermined value, said combustion state-determining means determines that the combustion state of said engine is in a first misfiring state which causes an adverse effect on component parts of said exhaust system if the misfiring rate exceeds a second predetermined value which decreases as the temperature of said exhaust system increases, and the combustion state of said engine is in a second misfiring state which causes degradation of exhaust emission characteristics of said engine if the misfiring rate is below said second predetermined value, said output-restraining means restraining the output from said engine when said combustion state-determining means determines that the combustion state of said engine is in said first misfiring state.

4. A combustion state control system as claimed in claim 3, further including engine rotational speed-detecting means for detecting rotational speed of said engine, and engine load-detecting means for detecting a load on said engine, and wherein said output-restraining means restrains the output from said engine when at least one of conditions is satisfied that the rotational speed of said engine exceeds a predetermined value and the load on said engine exceeds a predetermined value.

5. A combustion state control system as claimed in claim 4, further including engine temperature-detecting means for detecting a temperature of said engine, and intake air temperature-detecting means for detecting a temperature of air drawn into said engine, said predetermined value of the rotational speed and said predetermined value of the load on said engine being changed in response to at least one of the detected engine temperature and the detected intake air temperature.

6. A combustion state control system as claimed in claim 3, wherein said output-restraining means is disabled when the temperature of said exhaust system is below a second predetermined value.

7. A combustion state control system as claimed in claim 6, wherein said second predetermined value of the temperature of said exhaust system is changed in response to the misfiring rate of said engine.

* * * * *